Jan. 21, 1964  D. I. SCHNEIDERMAN  3,119,108
RADIO BEACON SENSING MEANS OF NAVIGATION
Filed Sept. 11, 1961
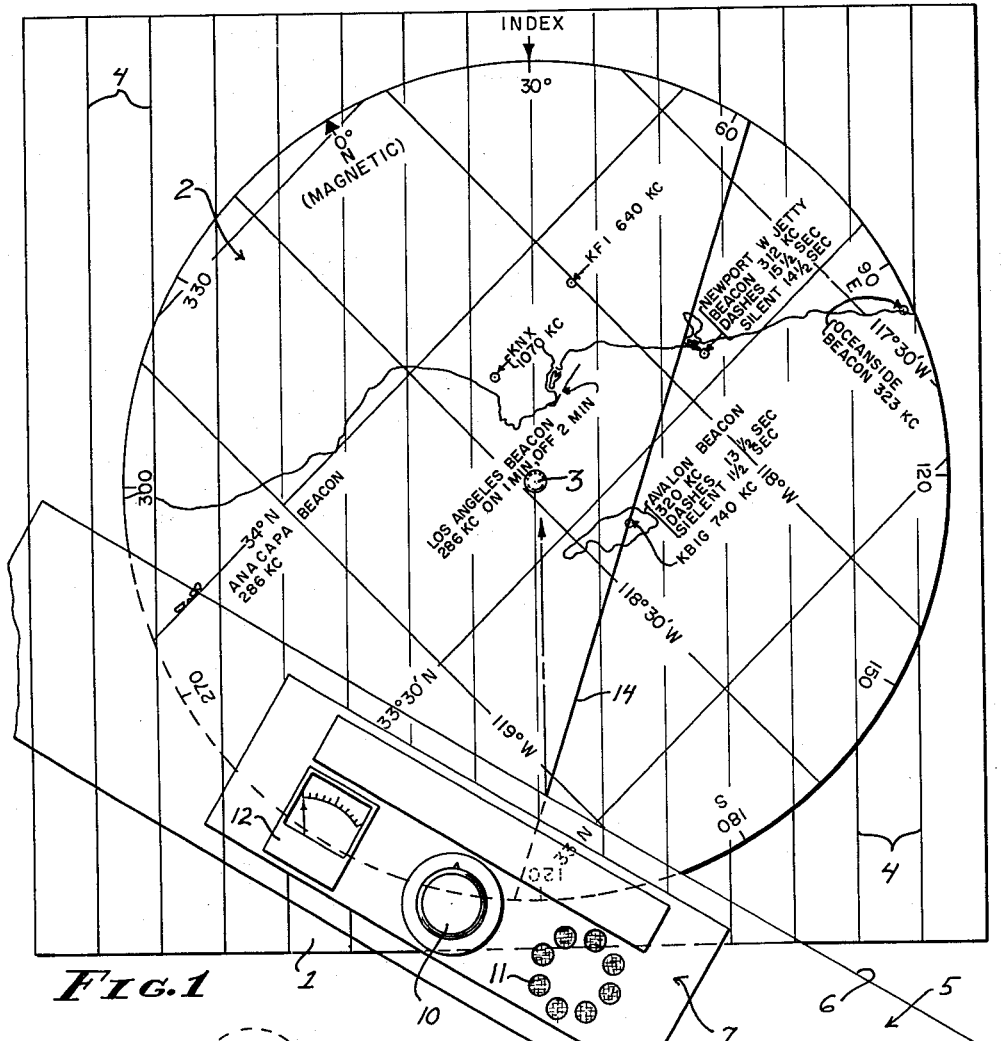
FIG. 1
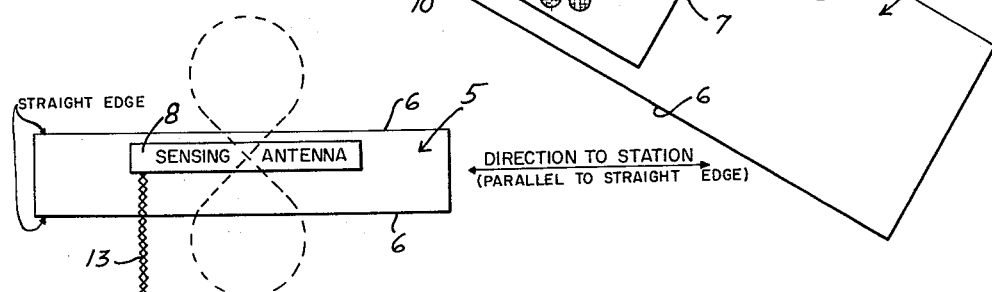
FIG. 2
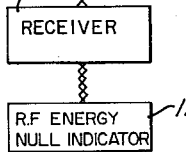
INVENTOR.
DANIEL I. SCHNEIDERMAN
BY
Lyon + Lyon
ATTORNEYS

United States Patent Office 3,119,108
Patented Jan. 21, 1964

3,119,108
RADIO BEACON SENSING MEANS OF
NAVIGATION
Daniel I. Schneiderman, 5515 Green Oak Drive,
Hollywood 28, Calif.
Filed Sept. 11, 1961, Ser. No. 137,356
2 Claims. (Cl. 343—115)

This invention relates to means of navigation, and included in the objects of the invention are:

First, to provide a means of navigation which requires no mathematical calculations and which may be readily utilized by one having little, if any, navigation experience, thus providing a means and method of navigation particularly adapted for owners or amateur pilots of small craft.

Second, to provide a means of navigation which is particularly inexpensive to manufacture and which is compact, to facilitate its use on craft which have heretofore been considered too small to carry conventional navigation equipment.

Third, to provide a means of navigation which utilizes a direction-sensitive radio receiver mounted on a straight edge, dimensioned for use on a map, whereby the direction of a sending station may be marked directly on the map.

Fourth, to provide a means of navigation which may utilize in conjunction with the combination radio receiver and straight edge a novel map involving a backing plate marked so as to be readily aligned with the longitudinal axis of a boat, and a map marked with the location of sending stations and arranged for rotation on the backing plate.

With the above and other objects in view, as may appear hereinafter, reference is directed to the accompanying drawings in which:

FIGURE 1 is a plan view of the means for navigation and illustrating its manner of use;

FIGURE 2 is a block circuit diagram of the receiver and antenna forming a part of the navigation means.

The means for navigation includes a base plate 1 on which is mounted a circular map 2 for rotation about a pivot 3. The base plate is preferably provided with a plurality of parallel lines 4.

As will be brought out more particularly hereinafter, the base plate 1 is oriented so that the parallel lines 4 are parallel to the keel or axis of the craft. One of the lines passes through the pivotal axis of the circular map and corresponds to the compass lubber line. The top of this line is marked "Index" in FIGURE 1 and is provided with an arrow directed to the edge of the circular map.

Printed on the map is the geographical area in which the navigation is to be conducted. More specifically, the map may indicate a coast line, islands, and other navigational information, such as longitude and latitude lines. In particular, the map contains the locations of various radio frequency transmitters which may be beacon transmitters or broadcast transmitters or both. The circular periphery of the map is marked off in degrees with the zero position preferably indicating the magnetic north, typical of the region depicted on the map.

A straight edge plate 5 is employed in conjunction with the map 2. The straight edge plate is preferably formed of a strip of clear plastic material and therefore has two straight edges 6.

Mounted on the straight edge plate 5 is a radio frequency receiver 7. The unit includes a direction-sensing antenna 8 and a receiver 9. The receiver may be per se a conventional radio frequency receiver. The receiver 9 includes a tuning dial 10 and a speaker 11. In addition, for accuracy of operation, there is provided a meter 12 which constitutes a radio frequency null indicator.

While it is desirable to mount the entire receiver unit 7 on the straight edge, it should be understood that the sensing antenna 8 only may be mounted on the straight edge plate 5. In this case the sensing antenna 8 is connected to the receiver 9 by a thoroughly shielded cable 13, represented in the diagrammatical view FIGURE 2. The sensing antenna 8 may be oriented in any desired position relative to the straight edges 6. Preferably, however, it is so oriented that its null axis is parallel to the straight edges.

Operation of the means for navigation is as follows:

While the apparatus may be used for various navigational problems, for purposes of illustration its use to find the location of a craft will be described.

The circular map 2 is rotated until the degree scale and its periphery correspond to the heading of the compass. In FIGURE 1 the compass heading is 30° east of magnetic north, therefore the 30° position of the degree scale is placed in coincidence with the index mark at the top of the base plate 1. The receiver is then tuned in on a selected station.

The circular map 2 illustrated shows a portion of the Southern California coast line which includes Anacapa Beacon operating at 286 kc. If this station is selected the straight edge plate 5 is turned until the meter 12 indicates a null reading, whereupon one of the straight edges 6 is placed on the location of the Anacapa Beacon and a line drawn on the circular map 2.

Another station, for example, KBIG at 740 kc. is selected and the straight edge plate 5 is turned until a null reading is again obtained, whereupon a second line is drawn represented by the heavy line 14 in FIGURE 1. The intersection of this line with the straight edge of the plate 5, as represented in FIGURE 1, represents the location or position of the craft. A line drawn from this intersection parallel to the parallel lines 4 indicates the direction the craft is heading.

It will be noted that it is possible by the navigation means thus described for one to locate the position of a craft without mathematical computations. Other navigational problems are similarly solved, as, for example, the problem of heading the craft on a desirable course.

It should be noted that while the base plate 1 and circular map 2 serve as a particularly convenient means of utilizing the straight edge plate 5, that a conventional map, bearing of course the locations of the radio frequency transmitters, may be used. In this case the conventional map is placed on a table or other surface and turned until the magnetic north position is properly oriented with respect to the heading of the craft, whereupon the straight edge plate 5 and the sensing antenna 8 mounted thereon are employed in the manner previously described.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A navigation means, comprising: a base plate bearing a reference line adapted to be placed in coincidence with the compass lubber line of a craft; a rotatable circular map mounted on said base plate for movement about an axis intersecting said reference line, said map having a peripheral degree scale and bearing the locations of radio frequency transmitters; a straight edge plate adapted to be placed on said map with a straight edge thereof passing through the location of a selected station; a direction sensitive antenna fixed to said straight edge plate and a radio frequency receiver including a station selector adapted to cooperate with said antenna to distinguish from other possible positions of said straight edge, that position of said straight edge which passes through the location of said selected station and the location of said craft.

2. A navigation means, comprising: a base plate bearing a reference line adapted to be placed in coincidence with the compass lubber line of a craft; a rotatable circular map mounted on said base plate for movement about an axis intersecting said reference line, said map having a peripheral degree scale and bearing the locations of radio frequency transmitters; a straight edge plate adapted to be placed on said map with a straight edge thereof passing through the location of a selected station; and a direction sensitive radio frequency receiver mounted on said straight edge plate adapted to detect said selected station and indicate when said straight edge coincides with a line between the location of said selected station and the location of said craft on said map.

References Cited in the file of this patent

FOREIGN PATENTS

| 301,126 | Italy | Sept. 27, 1932 |
| 1,264,544 | France | May 15, 1961 |

OTHER REFERENCES

Radio-Electronics, May 1960, pp. 94, 95, 98.